United States Patent [19]
Seltzer

[11] Patent Number: 6,019,256
[45] Date of Patent: Feb. 1, 2000

[54] CONDIMENT PUMP

[75] Inventor: Eric Seltzer, Reno, Nev.

[73] Assignee: Melinda Carucci, Reno, Nev.

[21] Appl. No.: 09/126,849

[22] Filed: Jul. 31, 1998

[51] Int. Cl.⁷ ..................................................... B67D 5/40
[52] U.S. Cl. ........................ 222/385; 222/372; 222/380; 222/381; 222/382; 222/383.1
[58] Field of Search ............................ 222/372, 380–382, 222/383.1, 385; 251/284; 137/533.11; 285/361, 396

[56] References Cited

U.S. PATENT DOCUMENTS

| | | |
|---|---|---|
| 1,307,478 | 6/1919 | Berdahl . |
| 2,811,284 | 10/1957 | Rogers ........................................ 222/173 |
| 2,837,246 | 6/1958 | Steele ........................................ 222/309 |
| 3,332,585 | 7/1967 | Cox ........................................... 222/309 |
| 4,917,525 | 4/1990 | Duncan ....................................... 403/27 |
| 5,375,746 | 12/1994 | Schaefer et al. ........................... 222/385 |
| 5,381,932 | 1/1995 | Humphrey ................................. 222/321 |
| 5,579,959 | 12/1996 | Bennett et al. ........................... 222/385 |

FOREIGN PATENT DOCUMENTS

516855  1/1940  United Kingdom .

Primary Examiner—Henry J. Recla
Assistant Examiner—Timothy L. Maust
Attorney, Agent, or Firm—David H. T. Wayment

[57] ABSTRACT

A piston displacement condiment pump for pumping viscous fluids, especially condiments such as catsup, mustard, mayonnaise, relish, sauces and the like, is disclosed The pump is constructed mostly of stainless steel and includes an inflow chamber with a ball valve, an outflow chamber with a ball valve, and a spout. The pump includes an optional method for limiting the amount of condiment delivered with each stroke of the pump. The spout is held in place with a unique pin and slot arrangement, and by the unique position of the outflow chamber in relation to the cover. There is also a novel spring wire clip which restrains the ball valve in the outflow chamber.

9 Claims, 8 Drawing Sheets

CONDIMENT PUMP

BACKGROUND OF THE INVENTION

1. Field of the Invention

This invention relates generally to pumps for viscous fluids. Specifically, the invention is a hand pump for use with condiments such as flavored syrups, catsup, mustard, mayonnaise, relish and similar products.

2. Description of Related Art.

Nearly all retail stores which sell ready to eat food have some type of system for allowing the customer to apply various condiments (e.g. catsup, mustard, relish, flavored syrup, etc.) to the food. And while there are various approaches to the problem of storing and dispensing condiments, one popular approach is to use a stainless steel tub and hand pump.

In general, the prior art consists of a piston displacement pump, an inlet chamber with a check valve, an outlet chamber with a check valve, and a dispensing spout. The combination of a piston displacement pump with two chambers and check valves predates their use in food dispensing. For example, Berdahl used this arrangement in an oil can, U.S. Pat. No. 1,307,478, granted Jun. 24, 1919. Turning to food dispensing, Cox used the same basic elements in an adjustable syrup pump, U.S. Pat. No. 3,332,585, as did Bennett et al. in U.S. Pat. No. 5,579,959. Two recent, popular food pumps, using this same approach, are Schaefer et al., U.S. Pat. No. 5,375,746, and Humphrey, U.S. Pat. No. 5,381,932.

A review of the prior art patents, particularly the discussion in Schaefer et al, Humphrey, and Bennett et al., shows that there has been an ongoing sense of frustration with the prior art pumps on the following grounds: they are too complicated to manufacture; they have too many parts; they are prone to clogging; and, they are difficult to clean.

Accordingly, there is a need for a condiment pump which is easy to manufacture, has a minimum of parts, resists dogging, and is easy to clean.

SUMMARY OF THE INVENTION

A condiment pump meeting the foregoing needs is disclosed. The condiment pump has a pump means in the form of a standard piston displacement pump. The standard piston displacement pump is well known in the art and is comprised of a cylinder, a rod with a piston at the bottom of the rod inside the cylinder which is biased, usually by a spring, in an upward position, and a seal attached to the piston which makes a tight but slidable fit with the interior wall of the cylinder. In the instant invention, the rod is optionally fitted with limiting means for limiting the travel of the rod. By limiting the travel of the rod within the cylinder, the condiment pump can be made to deliver a reduced volume of condiment.

The pump means has inflow means attached at the lower end of the pump means. The inflow means has an interior inflow chamber with a first valve means inside the interior chamber. The valve means is most conveniently made from a simple ball valve, although other types of check valves, such as flap valves are also possible. The inflow chamber has three openings: a top opening which communicates with the pump means; a bottom opening which communicates with the supply of condiment to be pumped; and a side opening which communicates with an outflow means. The inflow chamber is designed so as to prevent the spring from blocking the side opening.

The outflow chamber communicates with the side opening of the interior chamber of the inflow means using a piece of elbow tubing. The outflow means has an interior chamber with a top opening and a bottom opening, and a second valve means inside the outflow chamber. The elbow tubing has a lower end which communicates with the side opening of the inflow chamber and an upper end which communicates with the lower opening of the outflow chamber.

There is also a spout having an upper end and a lower end where the lower end is equipped with a spout adapter. The spout adapter is disposed inside the upper opening of the outflow chamber. The spout adapter has a pin which engages a u-slot pin receiving means in the upper end of the outflow means. The pin and pin receiving means prevent the spout from rotating relative to the outflow means. The spout adapter detachably engages a spring wire clip which prevents the valve means, typically a ball valve, from plugging the lower end of the spout.

The spout and the pump means both protrude through a cover with two orifices: a pump orifice and a spout orifice. The pump means includes a screw-on cap which is larger than the pump orifice, thus holding the cover tightly in place. The cover, in turn, then holds the spout adapter firmly within the upper end of the outflow chamber.

It is an object of the invention to produce a condiment pump which has a minimum of moving parts.

It is an object of the invention to produce a condiment pump which is easy to assemble and disassemble.

It is an object of the invention to produce a condiment pump which is easy to clean.

It is an object of the invention to produce a condiment pump which is inexpensive to manufacture.

It is an object of the invention to produce a condiment pump which resists clogging.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the claims.

DESCRIPTION OF THE PREFERRED EMBODIMENT

The condiment pump has five assemblies: a pump means, 100; an inflow means, 200; an outflow means, 300; a spout assembly, 400; and a lid assembly, 500. The overall arrangement of these assemblies may be seen in FIG. 1 and FIG. 2.

Figure 1:
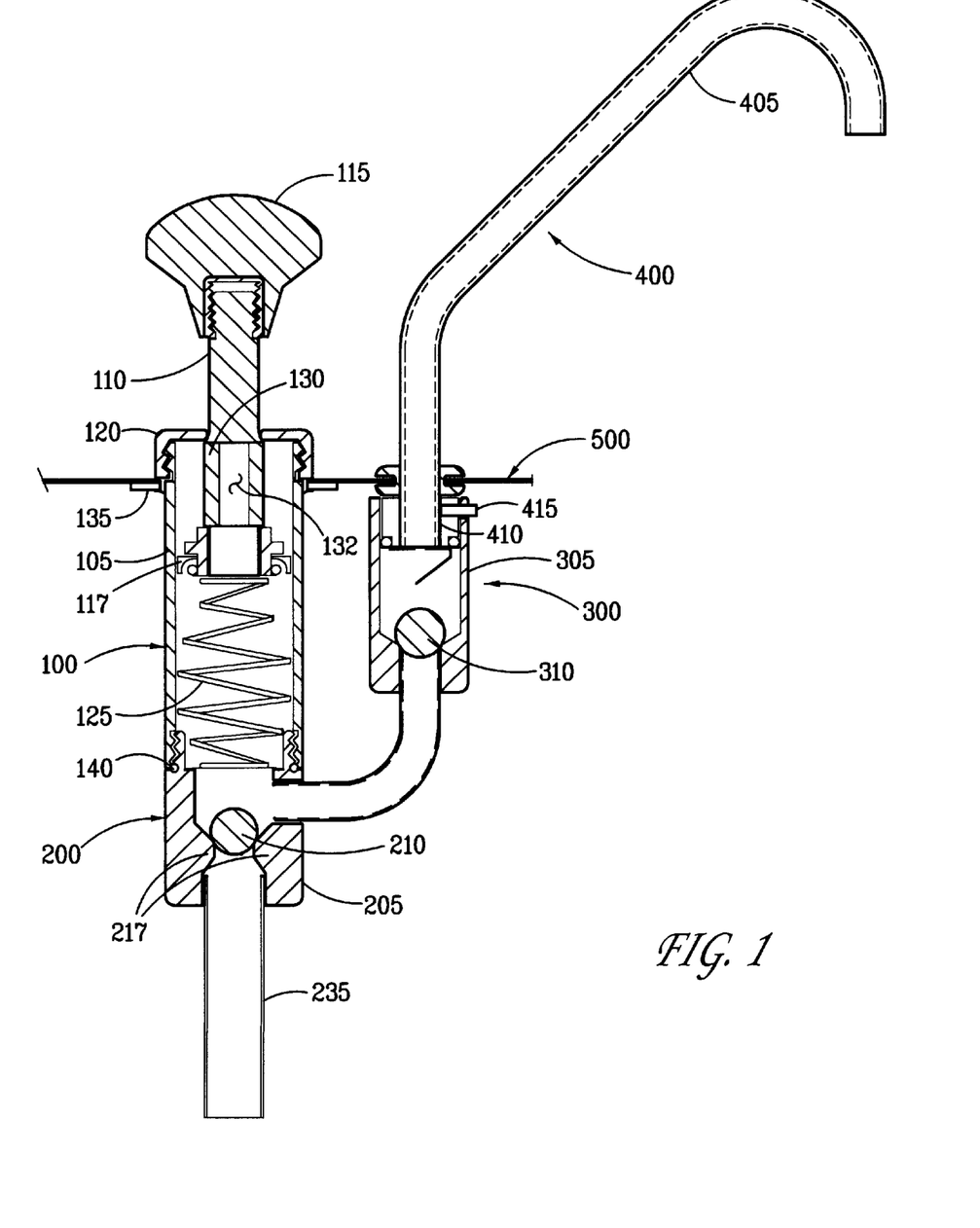
FIG. 1 is a cutaway view of the invention

The pump means, 100, is comprised of a cylinder, 105, which has a rod, 110, disposed within it, and a spring, 125, which biases the rod, 110, in an upward position. The rod, 110, has a detachable knob, 115, at its upper end, and a piston seal, 117, at its lower end. In FIG. 1 we see a plastic cylinder detachable limiting means, 130, with a slot, 132, which allows the detachable limiting means, 130, to be spread open and placed around the rod, 110. The limiting means, 130, limits the distance the rod, 110, can travel vertically and thus restricts the volume of condiment which is dispensed with each stroke of the rod, 110. The rod, 110, and piston, 119, are held Within the cylinder, 105, by a screw-on cap, 120. The screw-on cap, 120, also holds the lid assembly, 500, against a washer, 135, which is welded near the top of the cylinder, 105.

Figure 3:
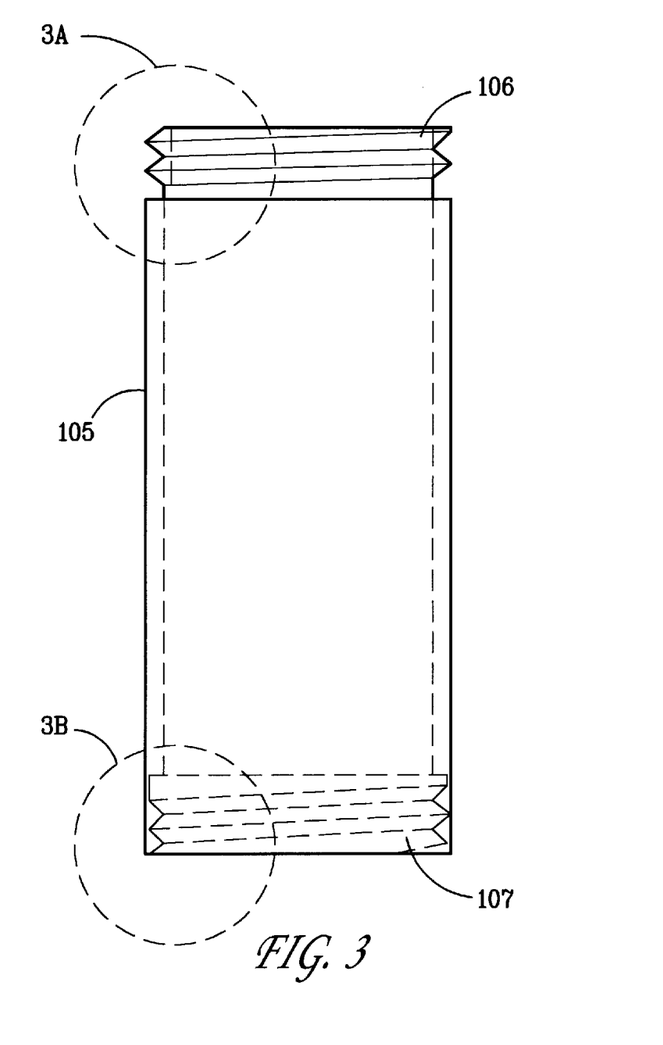
FIG. 3 is an elevation of the piston cylinder
Figure 3A:
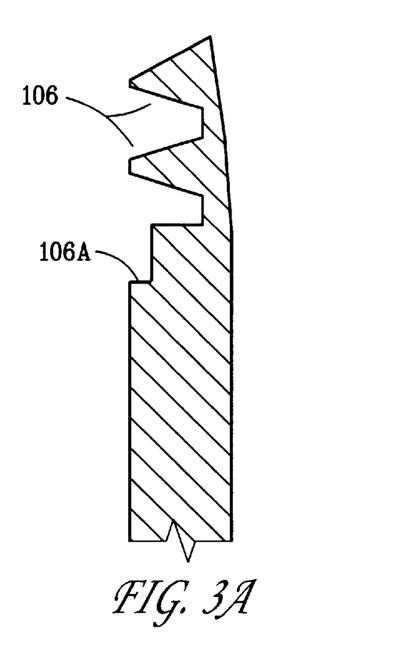
FIG. 3A is a cutaway view of a detail of the cylinder
Figure 3B:
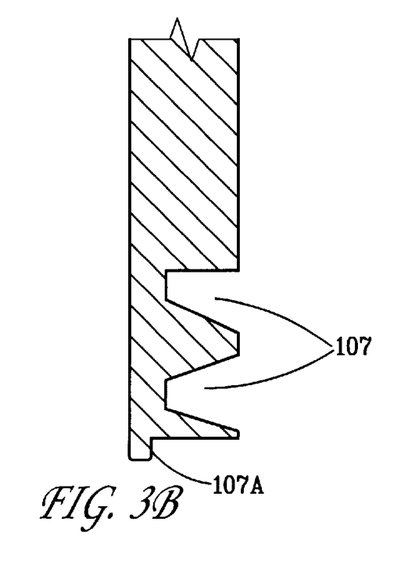
FIG. 3B is a cutaway view of a detail of the cylinder

In FIG. 3 we see a more detailed view of the cylinder, 105. The cylinder, 105, has male threads, 106, at its top end, and female threads, 107, at its bottom end. There is also a shoulder, 106A, disposed inwardly (ie. towards the center of the cylinder) of the male threads. The shoulder, 106A, supports the washer, 135. There is a slot, 107A, disposed inwardly from the female threads which accommodates a first o-ring, 140 (visible in FIG. 1 and FIG. 4A).

Figure 4:
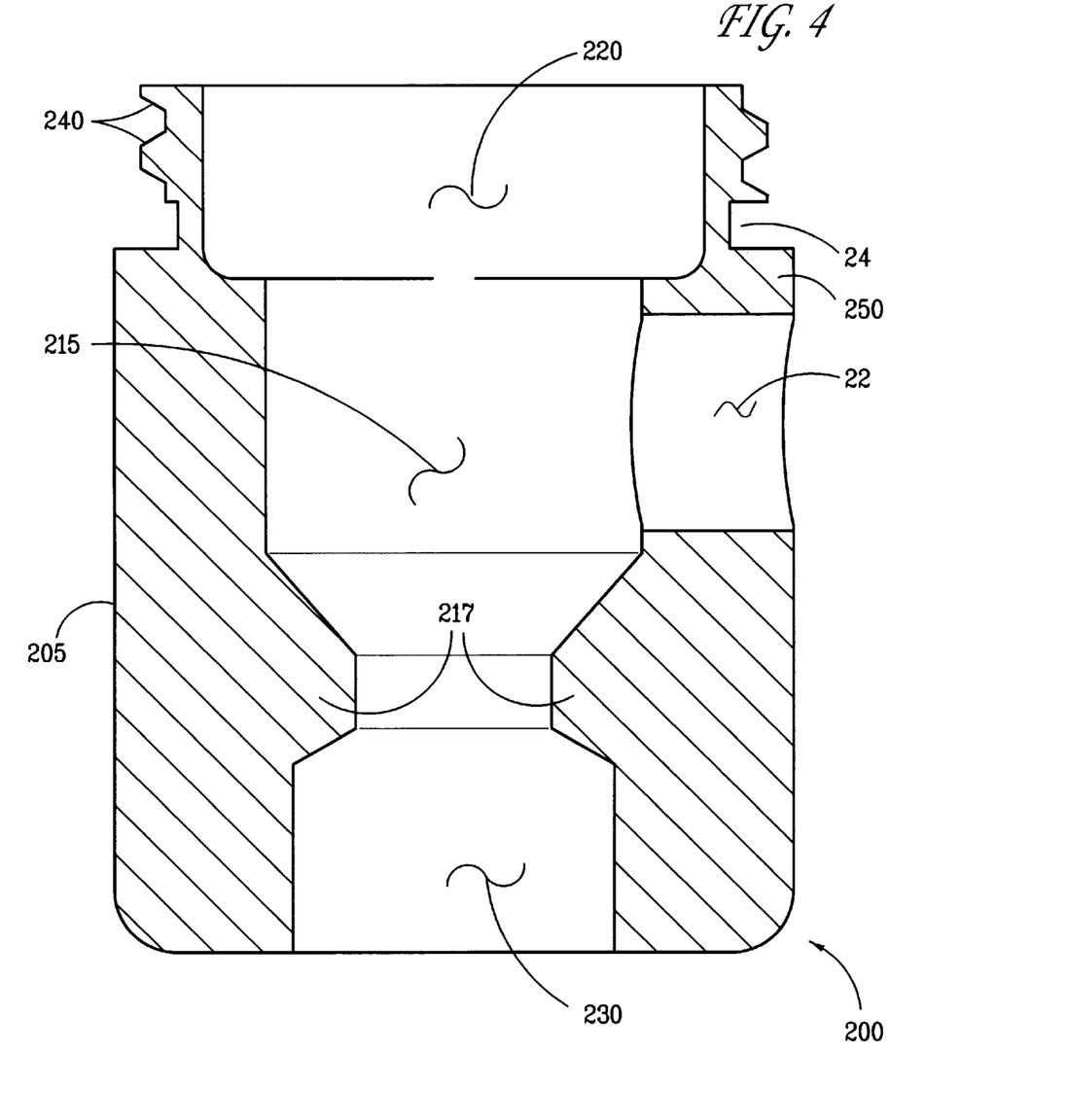
FIG. 4 is a cutaway view of the inflow means

Turning to FIG. 4 we see a detailed view of the inflow means, 200. The inflow means, 200, is comprised of an inflow body, 205, which has an inflow chamber, 215, with a first valve means comprised of a first ball, 210, and a first annular seat, 217, inside the inflow chamber, 215 (the first ball, 210, is removed from FIG. 4 for clarity but is visible in FIG. 1 and FIG. 2). The first valve means could be any type of check valve, from something simple like a flap valve to something complicated like an electric solenoid valve, but the combination of a ball and an annular seat has been found to be optimal in terms of simplicity of manufacture, low cost, and ease of disassembly and cleaning.

Figure 4A:
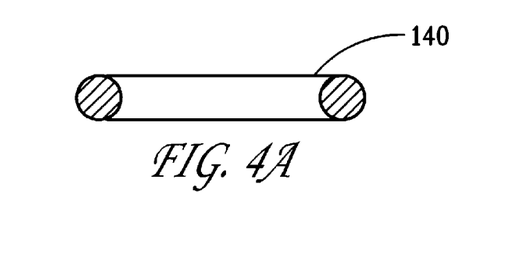
FIG. 4A is a cutaway view of an o-ring

The inflow chamber, 215, has a top opening, 220, a side opening 225, and a bottom opening, 230. The top opening, 220, and the bottom opening, 230, are parallel to each other with a mutual center line, and the side opening, 225, has a center line which is perpendicular to the center line of the top and bottom openings, 220, 230. The bottom opening, 230, is sized to make a pressure fit with a piece of plastic tubing, 235 (visible in FIG. 1) which comes in different lengths as needed for various condiment containers. The top opening, 220, is sized so as to receive the spring, 125, and has male threads, 240, which form a first o-ring groove, 245, and a shoulder, 250, disposed near the top of the inflow body. The first o-ring groove, 245, holds a first o-ring, 140, (FIG. 1 and FIG. 4A). The shoulder, 250, allows the bottom of the cylinder, 105, to contact the top of the inflow body, 205, while the male threads, 240, of the of the top opening, 220, engage the female threads, 107, of the cylinder, 105. The spring, 125, has closed ends, which prevent the ball, 210, from entering the cylinder, 105.

The first annular seat, 217, is disposed between the inflow chamber, 215, and the bottom opening, 230. The first annular seat, 217, is sized to be smaller in diameter than the first ball, 210, and cut at an angle (an angle of approximately eighty-two degrees is ideal) so as to make a good seal with the first ball, 210. When the condiment pump is full of fluid and the rod, 110, is pushed down against the spring, 125, the fluid in the cylinder, 105 and inflow chamber, 215, flow down against the first ball, 210, pushing the first ball, 210, against the first annular seat, 217, forming a seal which prevents fluid from flowing through the bottom opening, 230, thereby forcing fluid through the side opening, 225.

Figures 5, 6:
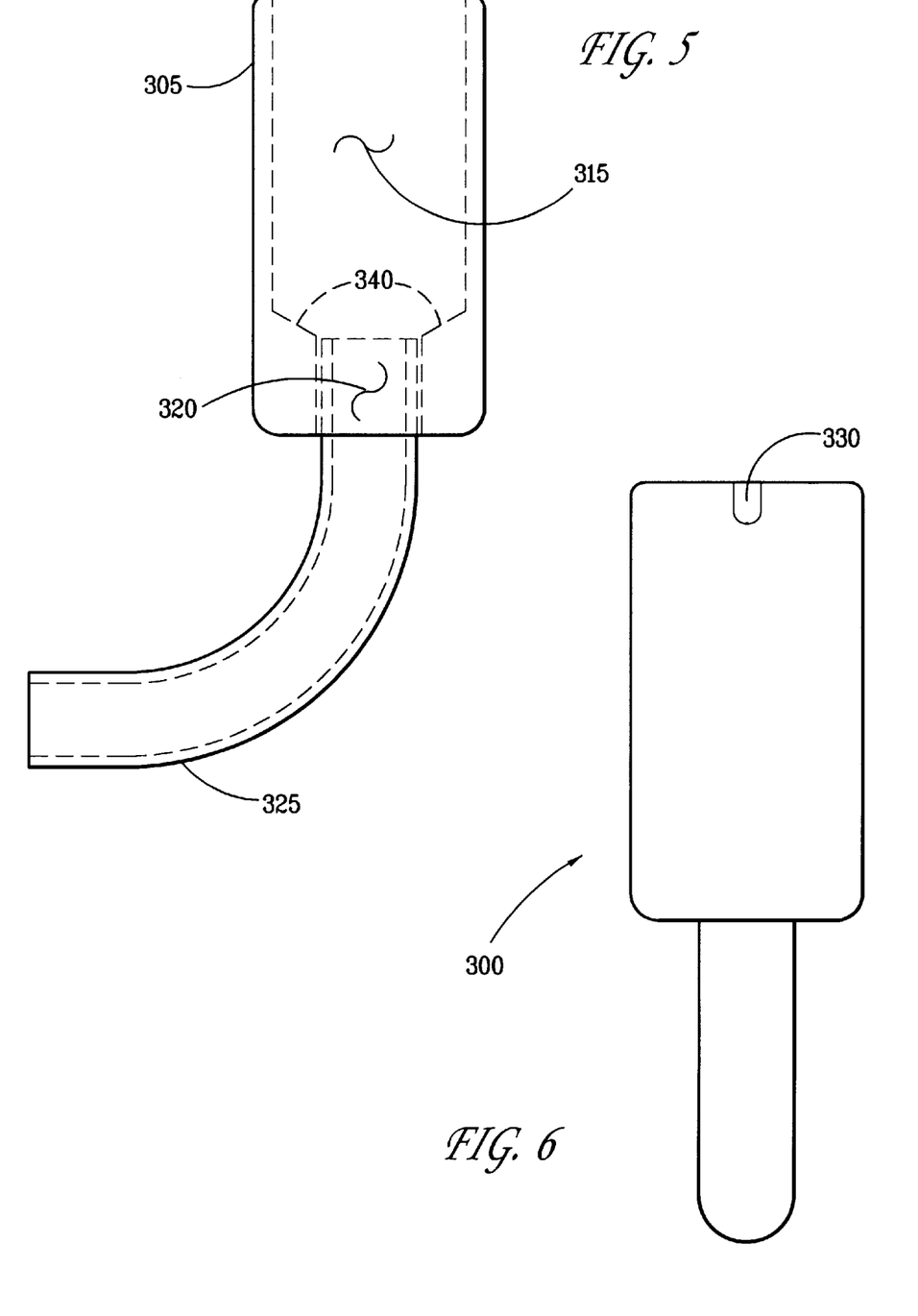
FIG. 5 is a transparent view of the outflow means
FIG. 6 is an elevation of the outflow means

FIG. 5 and FIG. 6 show the outflow means, 300, with an outflow body, 305, having an outflow chamber, 315, where the outflow chamber, 315, has a second valve means comprised of a second ball 310 (not shown for clarity but visible in FIG. 1 and FIG. 2), and a second annular seat, 340. At its upper end, the outflow body, 305, has a u-slot pin receiving means, 330, for receiving a pin. At its lower end, the outflow body, 305, has an annular seat, 340, which necks down to a lower orifice, 320, which receives the upper end of a piece of elbow tubing, 325. The elbow tubing is bent at an angle of approximately ninety degrees and is oriented so that the lower end of the elbow tubing, 325, is pointed at an angle of one hundred and eighty degrees relative to the position of the u-slot pin receiving means, 330. In this way, when the lower end of the elbow tubing, 325, is inserted into the side hole, 225, of the inflow body, 205, the u-slot pin receiving means, 330, will point directly away from the pump means, 100. On each end, the elbow tubing, 325, is sized for a pressure fit, although better results are obtained by welding the elbow tubing, 325, in place.

Figures 7, 8:
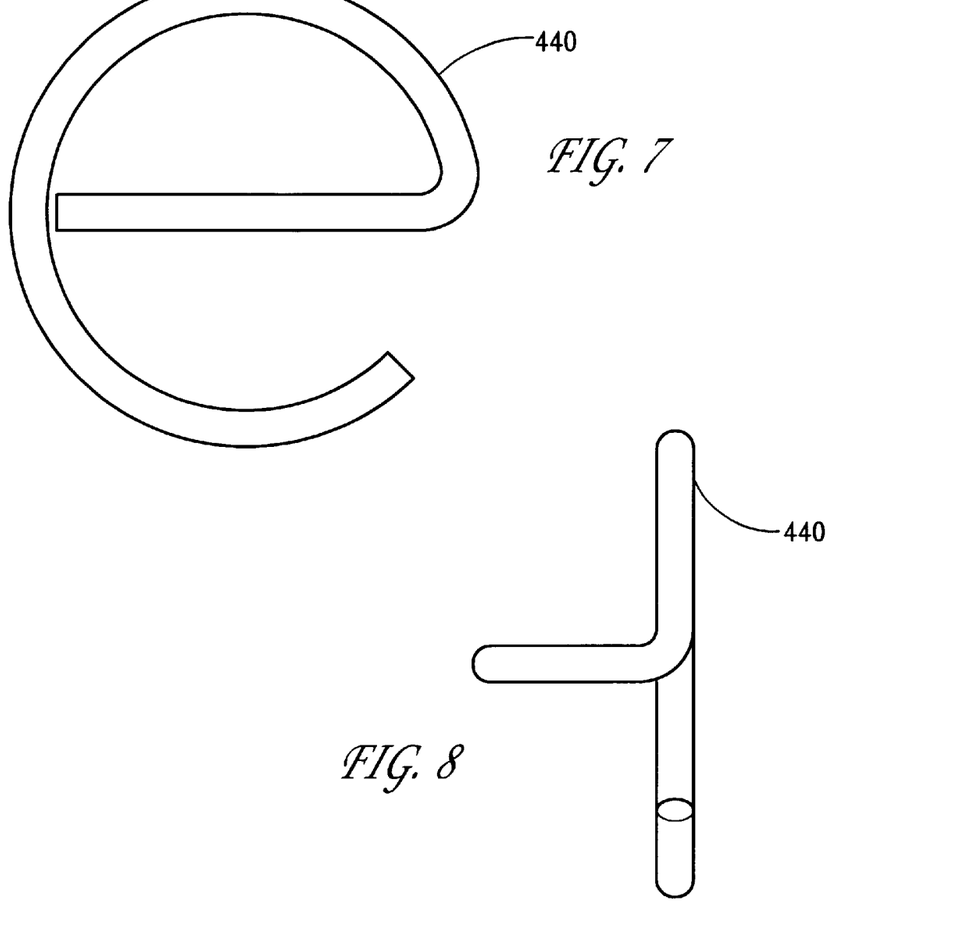
FIG. 7 is a plan view of the spring wire clip
FIG. 8 is an elevation of the spring wire clip
Figure 9:
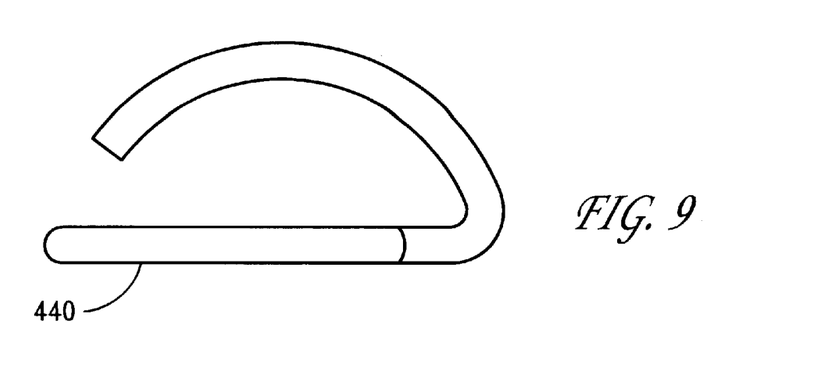
FIG. 9 is an elevation of the spring wire clip

Looking at FIGS. 7–9, we see three views of the spring wire clip, 440. The spring wire clip makes an arc of approximately three hundred and fifteen degrees in a first plane and then forms an arc of approximately one hundred and seventy degrees in a second plane where the first plane and second plane are perpendicular.

Figure 10:
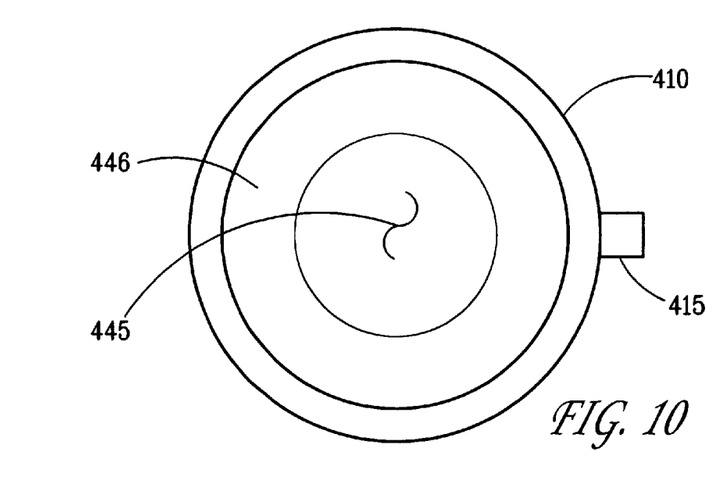
FIG. 10 is a top plan view of the spout adapter
Figure 11:
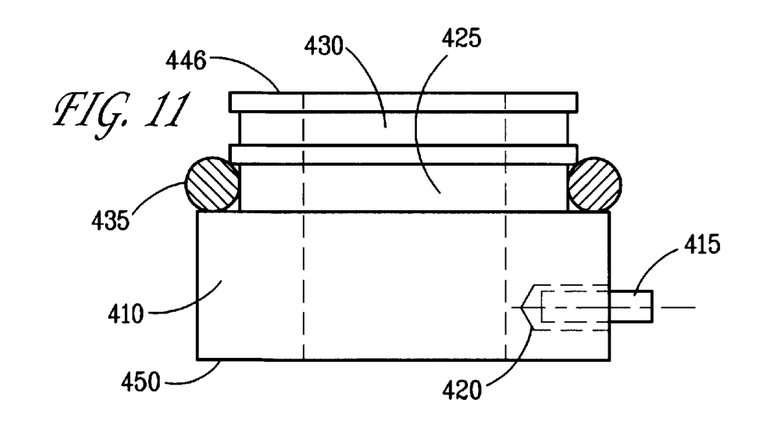
FIG. 11 is an elevation of the spout adapter
Figure 12:
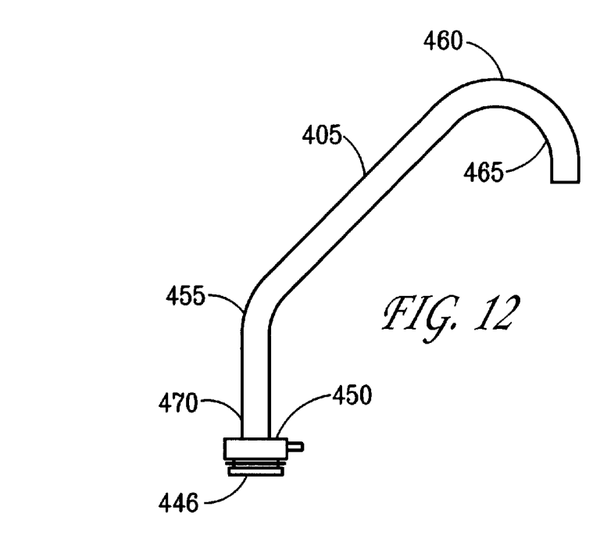
FIG. 12 is an elevation of the spout with the spout adapter
Figure 13:
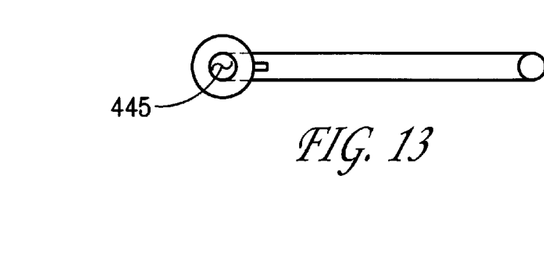
FIG. 13 is a bottom plan view of the spout with the spout adapter

The spout assembly, 400, is shown in FIGS. 10–13. FIGS. 12–13 show the completed spout assembly, 400, while FIGS. 10–11 show the spout adapter, 410, in detail. The spout, 405, has a lower end, 470, and a terminal end, 465. The spout, 405, has two curves, 455, 460, which, together change the direction of the spout by approximately one hundred and eighty degrees from the lower end, 470, to the terminal end, 465. The lower end, 470, is fitted with a spout adapter, 410, preferably by means of a pressure fit with a weld. The spout adapter has an upper surface, 450, and a lower surface, 446. The lower surface, 446, is machined to slightly reduce its overall diameter and to produce two slots, 425, 430. The upper slot, 425 (FIG. 11 is inverted in the informal drawings), receives an o-ring, 435, while the lower slot, 430, detachably engages the spring wire clip, 440. The lower end, 470, is pressed into a hole, 445, in the spout adapter, 410, and may be welded in place. The spout adapter, 410, has a pin hole, 420, which engages the pin, 415.

The spout, 405, is oriented in the spout adapter, 410, so that the pin, 415, points toward the terminal end, 465, of the spout, 405. Accordingly, when the spout assembly, 400, is placed in the outflow assembly, 300, so that the pin, 415, fits into the u-slot pin receiving means, 330, the terminal end, 465, of the spout, 405, will point directly away from the pump means, 100.

Figure 14:
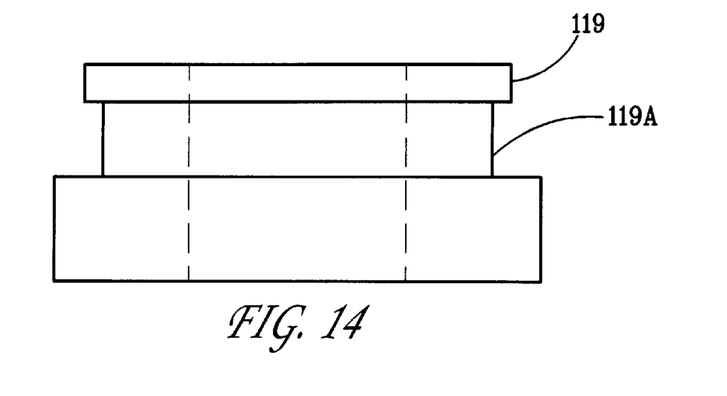
FIG. 14 is an elevation of the piston
Figure 14A:
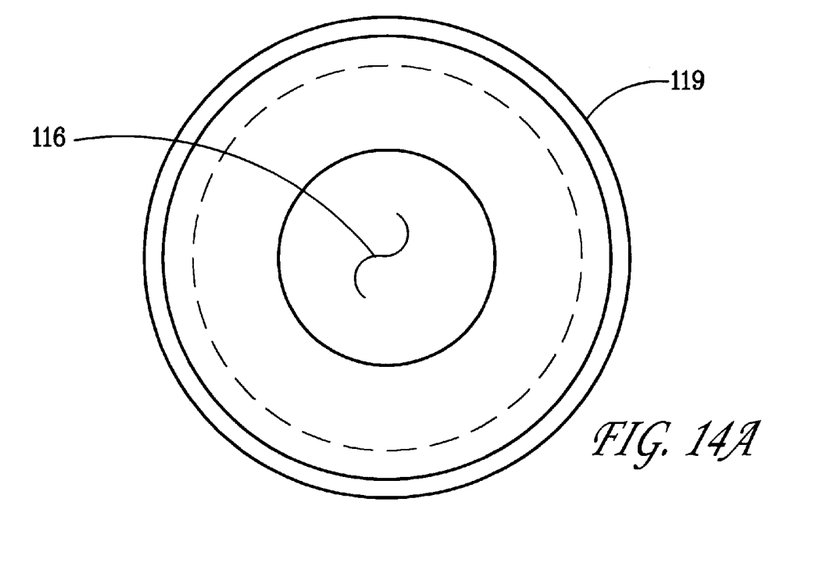
FIG. 14A is a plan view of the piston
Figure 15:
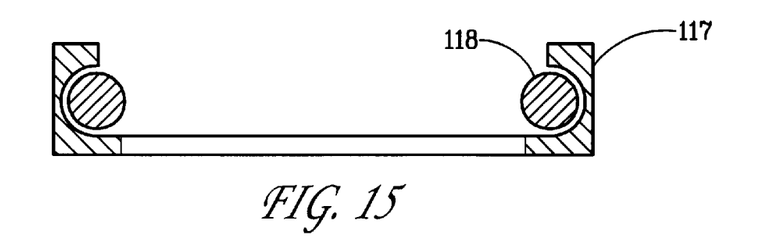
FIG. 15 is an elevation of the piston seal

In FIGS. 14, 14A, and 15, we see detailed drawings of the piston seal, 117, with o-ring, 118, and piston, 119 (with the piston, 119, shown inverted in the informal drawings). The piston, 119, has a rod hole, 116, into which the lower end of the rod, 110, is inserted and held in place with a pressure fit and/or a weld. The piston should be oriented so that the second o-ring groove, 119A, is disposed toward the bottom of the cylinder, 105, and away from the knob, 115. The piston seal, 117, with its second o-ring, 118, are then placed over the piston, 119, so that the second o-ring, 118, fits into the second o-ring groove, 119A.

Figures 2, 2A:
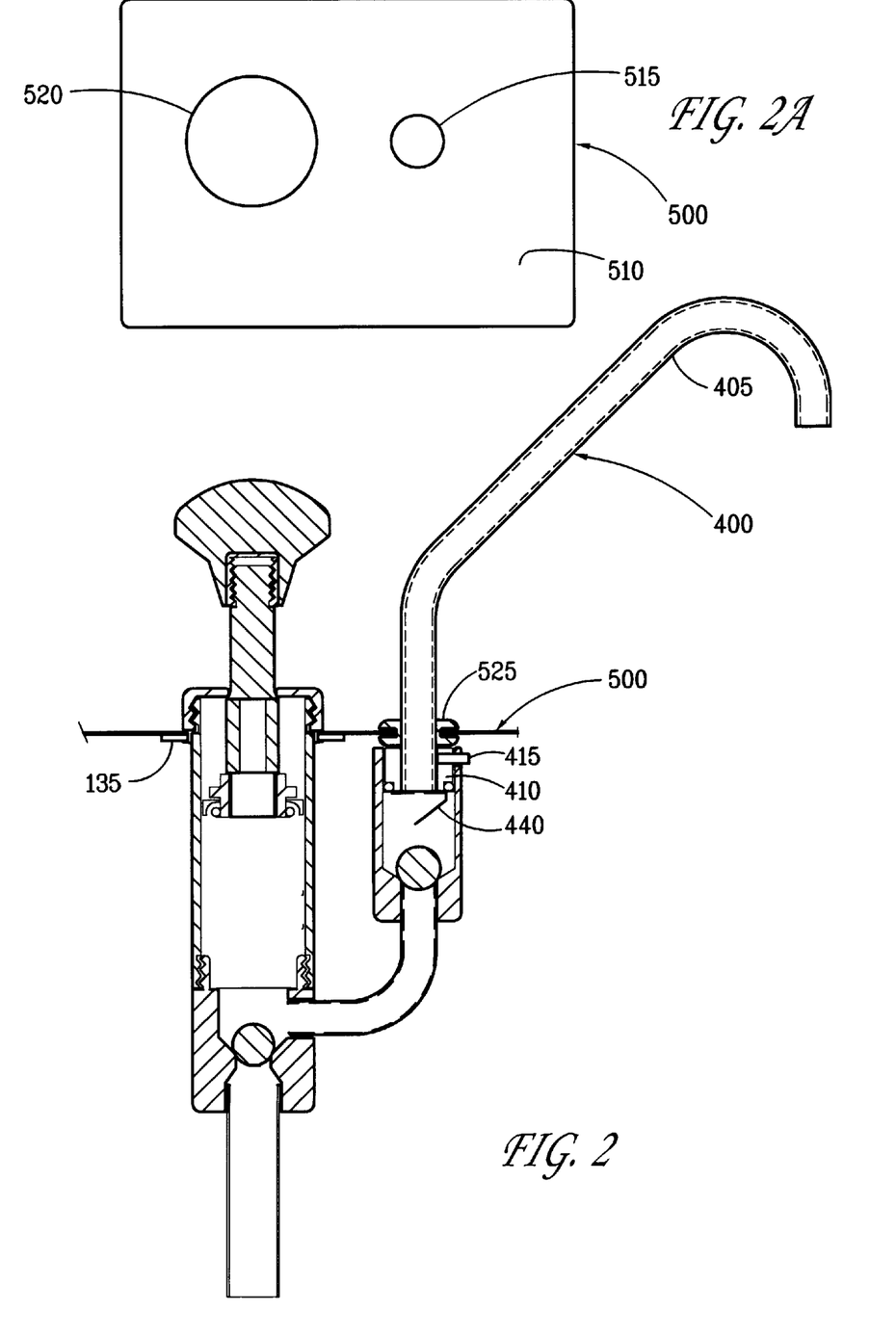
FIG. 2 is a cutaway view of the invention
FIG. 2A is plan view of the cover assembly

The cover assembly, 500, is visible in FIG. 2 and FIG. 2A. The cover assembly is comprised of a cover plate, 510, with a spout orifice, 515, and a pump orifice, 520. The spout orifice is fitted with a rubber grommet, 525. To place the cover assembly, 500, on the condiment pump, the user would first unscrew the threaded cap, 120, and remove the rod, 110. The user would then insert the spout, 405, through the spout orifice, 515, terminal end, 465, first, until the cover was positioned so that the pump orifice, 520, was resting on the washer, 135. The user would then place the rod, 110, back into the cylinder, 105, and then screw on the threaded cap, 120. The pump orifice, 520, is sized so that it is larger than the cylinder, 105, but smaller than either the washer, 135, or the threaded cap, 120. Accordingly, the washer, 135, and threaded cap, 120 hold the cover plate, 510, in place. The cover plate, 510, in turn holds the spout assembly, 400, in place, thus eliminating the need for the spout to be firmly attached to the cover itself.

The invention is used by placing the cover assembly, 500, with the pump attached as described above, over a condiment container or tub (usually made of stainless steel) which has an open top suitable for detachably engaging the cover assembly, 500. The bottom of the pump is thus immersed in the condiment which allows the user to pump condiment by operating the pump.

All parts of the invention are stainless steel, with the following exceptions: the knob, 115, made of plastic; the grommet, 525, and o-rings, 140, 435, and 118, made of rubber; and the piston seal, 117, and optional tube, 235, made of plastic.

Each of the elements described above, or two or more together, may also find a useful application in other types of methods differing from the type described above. While certain novel features of this invention have been shown and described and are pointed out in the annexed claims, it is not intended to be limited to the details above, because various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A device comprising:
   a. pump means for pumping a volume of viscous fluid, having an open, lower end;
   b. inflow means for allowing the viscous fluid to flow into the device, including an interior chamber, cooperative with the lower end of the pump means;
   c. first valve means for limiting the flow of viscous fluid to only one direction, disposed within the interior chamber of the inflow means;
   d. outflow means for allowing viscous fluid to flow out of the device, including an interior chamber with an open upper end and open lower end, where the outflow means is disposed both laterally and vertically from the inflow means and where the outflow means is cooperative with the inflow means;
   e. second valve means for limiting the flow of viscous fluid to only one direction, disposed within the interior chamber of the outflow means;
   f. pin receiving means for receiving a pin disposed near the open upper end of the interior chamber of the outflow means;
   g. a cylindrical spout having a long axis and having a lower end and a terminal end such that the long axis extends from the lower end to the terminal end,
   h. an annular spout adapter with a pin, cooperative with the lower end of the cylindrical spout and further cooperative with the open upper end of the interior chamber of the outflow means, and where the pin is disposed so as to detachably engage the pin receiving means; and a spring wire clip having an upper and lower portion where the upper portion detachably engages the spout adapter and where the lower portion is disposed so as to be perpendicular to the long axis of the cylindrical spout.

2. The device of claim 1, further comprising:
   a. limiting means for limiting the volume of viscous fluid pumped.

3. The device of claim 1, further comprising:
   a. a spring wire clip having an upper and lower portion where the upper portion detachably engages the spout adapter and where the lower portion is disposed so as to be perpendicular to the long axis of the cylindrical spout;
   b. limiting means for limiting the volume of viscous fluid pumped.

4. A pump for pumping viscous fluids, comprising:
   a. a piston displacement pump, having a top and a bottom suitable for pumping the fluids;
   b. an inflow body, having a top, an exterior wall, and a bottom, and having an interior chamber with a ball valve, disposed such that the top of the inflow body engages the bottom of the piston displacement pump;
   c. an outflow body, having a top and a bottom, and having an interior chamber with a ball valve, and further having a piece of elbow tubing with a first and second end and with the first end of the elbow tubing attached to the bottom of the outflow body, disposed such that the second end of the elbow tubing is connected to an opening in the exterior wall of the inflow body such that the outflow body is displaced both laterally and vertically from the inflow body;
   d. pin receiving means for receiving a pin disposed near the open upper end of the outflow means;
   e. a cylindrical spout having a long axis and having a lower end and a terminal end such that the long axis extends from the lower end to the terminal end,
   f. an annular spout adapter with a pin, cooperative with the lower end of the cylindrical spout and further cooperative with the open upper end of the interior chamber of the outflow means, and where the pin is disposed so as to detachably engage the pin receiving means; and a spring wire clip having an upper and lower portion where the upper portion detachably engages the spout adapter and where the lower portion is disposed so as to be perpendicular to the long axis of the cylindrical spout.

5. The device of claim 4, further comprising:
   a. limiting means for limiting the volume of viscous fluid pumped.

6. The device of claim 4, further comprising:
a. a spring wire clip having an upper and lower portion where the upper portion detachably engages the spout adapter and where the lower portion is disposed so as to be perpendicular to the long axis of the cylindrical spout;
b. limiting means for limiting the volume of viscous fluid pumped.

7. A pump for pumping viscous fluids, comprising:
a. a cylinder having a top and a bottom;
b. a rod having a top and a bottom, with the bottom of the rod disposed within the cylinder so that the rod can move vertically within the cylinder;
c. a knob attached to the top of the rod;
d. a piston and seal attached to the bottom of the rod;
e. a threaded cap with an orifice where the rod passes through the orifice and where the threaded cap has female threads which engage male threads at the top of the cylinder
f. a spring disposed within the cylinder, under the bottom of the rod, which biases the rod toward the top of the cylinder;
g. an inflow body, having a top, an exterior wall, and a bottom, and having an interior chamber with a ball valve, disposed such that the top of the inflow body engages the bottom of the piston displacement pump;
h. an outflow body, having a top and a bottom, and having an interior chamber with a ball valve, and further having a piece of elbow tubing with a first and second end and with the first end of the elbow tubing attached to the bottom of the outflow body, disposed such that the second end of the elbow tubing is connected to an opening in the exterior wall of the inflow body such that the outflow body is displaced both laterally and vertically from the inflow body;
i. pin receiving means for receiving a pin disposed near the open upper end of the outflow means;
j. a cylindrical spout having a long axis and having a lower end and a terminal end such that the long axis extends from the lower end to the terminal end,
k. an annular spout adapter with a pin, cooperative with the lower end of the cylindrical spout and further cooperative with the open upper end of the interior chamber of the outflow means, and where the pin is disposed so as to detachably engage the pin receiving means; and a spring wire clip having an upper and lower portion where the upper portion detachably engages the spout adapter and where the lower portion is disposed so as to be perpendicular to the long axis of the cylindrical spout.

8. The device of claim 7, further comprising:
a. limiting means for limiting the volume of viscous fluid pumped.

9. The device of claim 7, further comprising:
a. a spring wire clip having an upper and lower portion where the upper portion detachably engages the spout adapter and where the lower portion is disposed so as to be perpendicular to the long axis of the cylindrical spout;
b. limiting means for limiting the volume of viscous fluid pumped.

* * * * *